June 16, 1925.
J. D. PEMBERTON ET AL
1,542,718
NONGLARING HEADLIGHT FOR VEHICLES
Filed Nov. 6, 1923
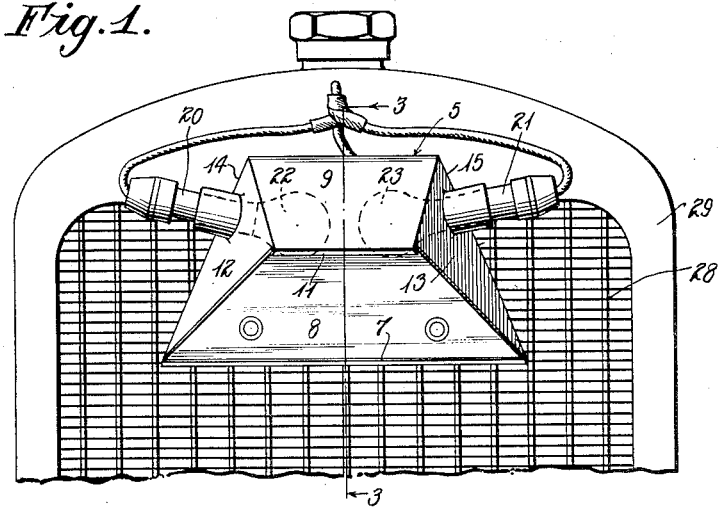
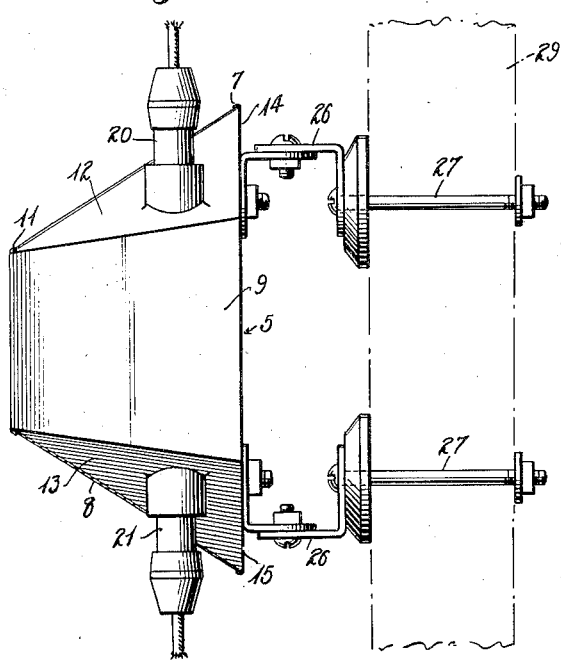
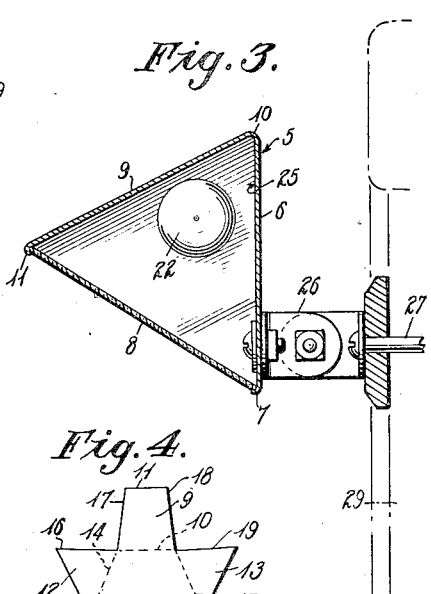
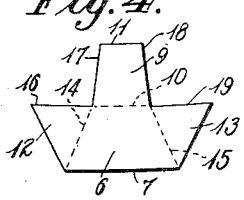
Inventors
James D. Pemberton
and James A. Burney
By Wilkinson & Guista
Attorneys Patented June 16, 1925.

1,542,718

UNITED STATES PATENT OFFICE.

JAMES DAVID PEMBERTON AND JAMES ARTHUR BURNEY, OF PLANT CITY, FLORIDA.

NONGLARING HEADLIGHT FOR VEHICLES.

Application filed November 6, 1923. Serial No. 673,139.

*To all whom it may concern:*

Be it known that we, JAMES DAVID PEMBERTON and JAMES ARTHUR BURNEY, citizens of the United States, residing at Plant City, in the county of Hillsborough and State of Florida, have invented certain new and useful Improvements in Nonglaring Headlights for Vehicles, of which the following is a specification.

This invention relates to non-glare headlights for vehicles, and has for one of its objects to provide a headlight particularly adapted for use on automobiles which will substantially completely eliminate the objectionable glare commonly radiating from said headlights, while at the same time adequately lighting the roadway.

A further object of the invention is to provide a headlight of the class described which may be used either as a substitute for the present well known headlights, or which may be used in conjunction therewith.

A still further object of the invention is to provide a headlight which will adequately illuminate the radiator fenders, front wheels and other portions of the front of a car, so as to enable the driver of an approaching car to easily see the same, and so gauge his distance as to pass the said car in safety.

A still further object of the invention is to provide a device of the character described which will be simple in construction, comparatively inexpensive to manufacture and more efficient in use than those which have been heretofore proposed.

With the above and other objects in view, which will appear as the description proceeds, the invention consists in the novel details of construction and combinations and arrangements of parts, more fully hereinafter disclosed and particularly pointed out in the appended claims.

Referring to the accompanying drawings forming a part of this specification in which like characters designate like parts in all the views;

Figure 1 is a front elevational view of a portion of an automobile showing a headlight constructed in accordance with the present invention attached thereto;

Fig. 2 is a top plan view of the parts shown in Fig. 1, the radiator being shown in broken lines;

Fig. 3 is a central vertical sectional view taken approximately on the plane indicated by the line 3—3 of Fig. 1, looking in the direction of the arrows; and, Fig. 4 is a diagrammatic view on a reduced scale of the blank which may be employed for forming the headlight casing.

Referring more particularly to the said drawings, the numeral 5 indicates generally the headlight casing, which is preferably formed from sheet metal which may be stamped or otherwise cut to substantially the shape shown in Fig. 4. The said casing comprises a rear wall 6, the lower edge 7 of which may be turned, as indicated in Fig. 3, to provide a ledge or bead for supporting a glass plate or other transparent member 8, constituting the light emitting closure for the lamp. The said casing is also provided with a top wall 9, which may be formed integral with the rear wall 6 and bent along the dotted line 10, see Fig. 4, to occupy a downwardly inclined position, as will be clear from Figs. 1 and 3. The forward edge 11 of the said top wall 9 may also be bent, as shown in Fig. 3, to form a ledge or bead to receive and support another edge of the transparent plate 8.

Integrally formed with the back wall 6 is a pair of substantially triangular shaped side walls, 12 and 13, which may be bent respectively along the broken lines, 14 and 15, to form inwardly and upwardly inclined sides for the casing 5, as will be readily understood. The meeting edges 16, 17, 18 and 19 of the side walls, 12 and 13, and top wall 9, may be suitably secured together by soldering or brazing, or in any other desired manner.

The blank shown in Fig. 4 is thus bent to form a casing shaped substantially as shown in Figs. 1, 2 and 3, and the inclined side walls, 12 and 13, of the casing, are suitably apertured to receive lamp receiving sockets, 20 and 21, respectively, which accommodate suitable incandescent lamps 22 and 23, as indicated in Figs. 1 and 3. The sockets 20 and 21 are preferably so positioned that when the lamps 22 and 23 are placed therein, as indicated, their filaments will occupy a plane somewhat above the lower edge 11 of the inclined top wall 9, as is clearly indicated in the said Figs. 1 and 3. It thus results that this said top wall will serve to intercept any direct light rays and prevent them from shining directly forward into the eyes of the driver of a car approaching from the front. In like manner, the side walls, 12 and 13, will serve to intercept light rays from the filaments of the lamps, which would ordinarily be projected toward the sides of the vehicle and tend to blind the drivers of other cars when in positions at the sides of the car.

The inner surfaces of the walls, 6, 9, 12 and 13, may all be of a highly reflecting character so that any light rays which impinge upon them, will be reflected more or less downwardly in front of the car or in substantially horizontal planes toward the front below the plane of the eyes of the driver of the approaching car. On the other hand, in order to further lessen the glare from the present lamp, it is preferred to make the inner surface of the rear wall 6 of a more or less non-reflecting character so that any light rays which may be reflected therefrom will be of a subdued character and will not serve to blind an approaching driver. This object may be accomplished by painting or enameling the inner surface of the rear wall 6 at least as high as the point 25, with some color which will absorb more or less of the light rays, rather than reflect them, such for example as a green color. On the other hand the inner surfaces of the walls 9, 12, and 13 may be polished or coated with a highly reflecting paint or enamel, such for example as white.

It will be noted that the vertical edges of the rear wall 6 are inclined and converge upwardly, while the side edges of the top wall also converge forwardly, so that when the side walls, 12 and 13, are bent to meet the edges, 17 and 18 of the top wall, they will occupy inwardly and upwardly inclined positions. It results from this peculiar shaping of the casing, that substantially all of the light rays which are intercepted by the top and side walls, are reflected in a downwardly direction thus illuminating not only the roadway immediately in front of the vehicle, but also a large portion of the front of the vehicle itself.

It thus results that when a car equipped with the present device approaches a car going in the opposite direction, if only the present lamp be employed, the driver of the approaching car will not only have his eyes shielded from the direct rays of the lamps 22 and 23, but, owing to the fact that substantially all of the light rays are projected in a downwardly direction and in such a manner as to illuminate the front of the car, the said approaching driver will be enabled to accurately distinguish the front portions of the car and so judge his distances as to safely pass the same.

The present lamp may be employed in pairs if desired, as substitutes for the usual and well known headlights, but it is preferred to use only a single lamp which may be positioned substantially on the center line of the car and may be attached thereto in any suitable manner, as for example by means of the brackets 26 and bolts 27, extending through the core 28 of the vehicle radiator 29.

When so positioned, this lamp may likewise be employed in conjunction with the usual type of headlights, which latter may be employed when the car is traveling over the country roads at night and no other cars are approaching in the opposite direction. Such lamps, as is well known, usually project beams of light for considerable distances in advance of the car, thus enabling the driver thereof to see a sufficient distance ahead to permit him to proceed at relatively high speed.

On the other hand, when a car approaches in the opposite direction the high powered headlights may be turned off, whereupon the driver of the approaching car will not be subjected to the glare therefrom, but still be enabled to safely pass the car equipped with the present invention, due to the fact that he can adequately see the outline of the front portion of the same.

While one form of the invention has been illustrated and described herein, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. In a non-glaring headlight for vehicles, a source of light; and a casing enclosing said source having a vertical rear wall, the side edges of which converge upwardly, a top wall inclined downwardly from the upper edge of said rear wall and its side edges converging forwardly and inwardly, and forwardly inclined side walls joining the adjacent converging edges of said rear and top walls, said rear wall projecting below the forward edge of said top wall, and said top and side walls constituting shields to prevent the direct forward projection of light rays from said source into the eyes of an approaching driver.

2. In a non-glaring headlight for vehicles, a source of light; and a casing enclosing said source having a flat vertical trapezoidal rear wall, a flat trapezoidal top wall extending forwardly and downwardly from the upper edge of said rear wall, its side edges constituting continuations of the side edges of said rear wall, and inwardly and forwardly inclined flat side walls joining the complementary edges of said rear and top walls, the inner surfaces of said top and side walls being of a highly reflecting character, said rear wall projecting below the forward edge of said top wall and having its inner surface of a more light-absorbing character, said source of light being positioned above said forward edge of said top wall, whereby said top wall, as well as said side walls serve as shields to prevent the direct forward projection of light rays from said source into the eyes of an approaching driver.

3. A headlight for vehicles comprising a casing substantially triangular in cross section, formed from a metal blank providing a substantially vertical rear wall having upwardly converging side edges, a downwardly inclined top wall having forwardly converging side edges, and inwardly and upwardly inclined side walls integral with said rear wall and secured to the edges of said top wall; a transparent closure member; and means for securing said headlight to a portion of a vehicle.

JAMES DAVID PEMBERTON.
JAMES ARTHUR BURNEY.